United States Patent [19]

Uffner et al.

[11] Patent Number: 4,528,241

[45] Date of Patent: Jul. 9, 1985

[54] CHEMICALLY MODIFIED ASPHALTS AND GLASS FIBERS TREATED THEREWITH

[75] Inventors: William E. Uffner, Newark; Robert N. White, Etna, both of Ohio

[73] Assignee: Owens-Corning Fiberglas Corporation, Toledo, Ohio

[21] Appl. No.: 577,394

[22] Filed: Feb. 6, 1984

Related U.S. Application Data

[62] Division of Ser. No. 407,390, Aug. 12, 1982.

[51] Int. Cl.³ .................... B32B 11/00; C08L 95/00
[52] U.S. Cl. .................... 428/378; 428/265; 428/290; 428/291; 428/375; 428/392; 428/394; 428/440; 428/441; 428/489; 428/521
[58] Field of Search ............ 525/54.5; 524/68, 59; 527/500; 428/265, 290, 291, 440, 441, 375, 378, 392, 394, 489, 521

[56] References Cited

U.S. PATENT DOCUMENTS

| | | | |
|---|---|---|---|
| 3,265,765 | 8/1966 | Holden | 524/534 |
| 4,032,491 | 6/1977 | Schoenke | 524/68 |
| 4,074,948 | 2/1978 | Heater | 404/75 |
| 4,130,156 | 12/1978 | Gagle | 524/71 |
| 4,175,978 | 11/1979 | Marzocchi | 106/281 R |
| 4,201,812 | 5/1980 | Blanken | 428/95 |
| 4,217,259 | 8/1980 | Bresson | 524/68 |
| 4,273,685 | 6/1981 | Marzocchi | 427/389.8 |
| 4,404,316 | 9/1983 | Marzocchi | 525/54.5 |
| 4,444,947 | 4/1984 | Harrington | 525/54.5 |

FOREIGN PATENT DOCUMENTS

740027  8/1966  Canada .

OTHER PUBLICATIONS

Solprene, "Elastomers & Plastomers", Phillips Chem. Co.

*Primary Examiner*—Ellis P. Robinson
*Attorney, Agent, or Firm*—Ronald C. Hudgens; Robert F. Rywalski

[57] ABSTRACT

Improved chemically modified asphalts are provided of the type which is the reaction product of asphalt, a vinyl aromatic monomer and a rubbery polymer. The improved compositions are capable of impregnating glass fiber bundles and have increased elastic recovery rates, increased viscosity stability, less tack and lower viscosity. Such improved compositions are obtained by employing a styrene-butadiene thermoplastic rubber copolymer as a coreactant with the asphalt and vinyl aromatic monomer.

5 Claims, No Drawings

CHEMICALLY MODIFIED ASPHALTS AND GLASS FIBERS TREATED THEREWITH

This is a division of application Ser. No. 407,390, filed 8/12/82.

CROSS REFERENCES

The present application is related to co-pending application U.S. Ser. No. 359,328 and 360,729 now U.S. Pat. No. 4,440,816, both of which are hereby incorporated by reference.

TECHNICAL FIELD

The present invention is related to chemically modified asphalt compositions, and more particularly, to chemically modified asphalt compositions which are the reaction product of asphalt, a vinyl aromatic monomer and a rubbery polymer. The present invention also relates to glass fibers which are treated with such chemically modified asphalt compositions.

BACKGROUND AND SUMMARY

Chemically modified asphalts, which are produced by reacting asphalt, a vinyl aromatic monomer and a rubbery polymer, are known in the art and are exemplified by U.S. Pat. No. 4,273,685 (hereby incorporated by reference). Such a chemically asphalt has been employed for purposes of the repair and maintenance of roads, highways, parking lots, driveways, airport runways and the like (hereinafter highway repair and maintenance) as well as for purposes of waterproofing bridge decks. It has also been used to coat fibrous glass reinforcements.

In the above incorporated patent applications, laminates are disclosed which are suitable for highway repair and maintenances purposes which include a membrane comprised of an asphaltic coated fibrous glass reinforcement material having a pressure sensitive adhesive layer on one side of the laminate. The pressure sensitive adhesive is adapted for bonding to cementitious substrates, such as Portland cement substrates, and asphaltic concrete substrates. The asphaltic coating on the fibrous glass reinforcement is a chemically modified asphalt which is also the reaction product of asphalt, a polymerizable vinyl aromatic monomer and a rubber polymer. A chemically modified asphalts of the above type, which has received extensive evaluation, is the reaction product of an AC-20 paving grade asphalt, styrene, and an elastomeric styrene-butadiene copolymers. AC-20 paving grade asphalt has a viscosity of about 500-550 cps. at 260° F. and about 100-120 cps. at 300° F. and a penetration of about 40 to about 60 or 65, and the styrene-butadiene copolymer which has been employed is commercially available, and indicated in the literature, to be an A-B type, linear block elastomer. Such chemically modified asphalts as represented by the use of the above-indicated ingredients for their formation, have many outstanding properties, but they are deficient in certain respects. Such compositions could receive more widespread adoption if their elastic recovery rate could be increased, if their viscosity stability could be increased as well as reducing their viscosity, and if they were less tacky and if they would impregnate glass fiber bundles. By providing such improvements in the properties, the materials would show improved operational characteristics when employed for highway repair and maintenance purposes, as well as for waterproofing coatings on bridgedeck membranes. Additionally, they would more easily be suitable for use as hot melt adhesives or solvent base adhesives and for various spray coating applications. Thus, by providing for a decreased viscosity, the materials would be easier to spray and could be used directly in the field, or in forming the above indicated type laminates, at lower temperatures. Additionally, by increasing their viscosity stability, more reliable results will be obtained both in the field and in forming such laminates, and the improved elastic recovery will provide improved results in actual field uses. Finally, by providing for a less tacky material, the laminates of the type generally discussed above can more easily be handled because of minimal tendency for interlaminate adhesion. Moreover, less tack will result in less tire tracking which is quite significant in highway repair and maintenance. Finally, by providing for material which is capable of impregnating glass fiber bundles, the abrasion resistance between the individual filaments of the bundle is greatly decreased and, consequently, the tensile strength of such impregnated glass fiber bundles is increased, thereby providing for improved field operation.

For further reference to membranes which include a supporting material and an asphaltic coating which is not a pressure sensitive adhesive on one side and, on the opposite side, an asphaltic coating which is a pressure sensitive adhesive, reference may be had to U.S. Pat. Nos. 3,741,856 and 3,900,102 which claim or disclose such laminated structures.

Thus, in accordance with the present invention, improvements are provided in chemically modified asphalts of the type which are the reaction product of asphalt, a vinyl aromatic monomer and a rubbery polymer, wherein the improved composition has an increased elastic recovery rate, increased viscosity stability, is less tacky and has lower viscosity, and can impregnate fiber glass bundles which are comprised of a multitude of individual glass fiber filaments. Such improved compositions are obtained by employing as the rubbery polymer a thermoplastic rubber, generally linear, non radial, block copolymer of styrene and butadiene having polystyrene end blocks and a polybutadiene mid block. Thus, in contrast to the above indicated A-B elastomers, the presently employed thermoplastic rubbers may generally be viewed as being of the A-B-A type, linear block copolymers.

DESCRIPTION

The A-B-A type thermoplastic rubber copolymer, which is employed in the present invention, as indicated, comprises end blocks of polystyrene and a mid block of butadiene. These copolymers are linear, non-radial copolymers and are generally viewed as thermoplastic, because they can be processed, for example extruded, like conventional thermoplastic organic polymers. That is, they can be repeatedly heated and cooled with no substantial loss in their properties, especially their elastomeric properties at room temperaure. Additionally, they are referred to as rubbers because of their elastomeric properties at room temperature. In contrast, linear A-B block elastomers of styrene and butadiene are not considered thermoplastic rubbers because they cannot be processed like thermoplastic materials. Such materials, for example, undergo crosslinking when subjected to heating and cooling cycles resulting in a substantial change in their properties. Thus, a significant difference is that the block copolymers of the type employed herein, namely the A-B-A type block copolymers, substantially retain their properties when subjected to heating and cooling cycles, whereas A-B type block materials will not.

The styrene-butadiene thermoplastic rubber generally linear, non-radial block copolymers having polystyrene end blocks and a polybutadiene mid block employed in the present invention are commercially available, and their methods of production are well known in the art. Suitable thermoplastic rubber copolymers are commercially available from Shell Chemical Company as their Kraton 1100 series thermoplastic rubbers.

While not forming an essential aspect of this invention, the synthesis of such A-B-A copolymers will be briefly described for a fuller understanding thereof.

In one method, styrene may be polymerized in a substantially inert hydrocarbon medium in the presence of a monofunctional alkali metal alkyl compound such as, for example, a lithium alkyl to form an initial polymer block carbanion A terminated with a lithium ion. Without further treatment, the butadiene is introduced and block copolymerization affected to produce the intermediate block copolymer carbanion A-B associated with the alkali metal ion, such as lithium. Finally, styrene is again introduced and polymerization continued to form the desired A-B-A polymer, i.e., the thermoplastic rubber having polystyrene end blocks and polybutadiene mid block. An optional process for the preparation of the block copolymers comprises the initial formation of a center block of a conjugated diene by the use of a difunctional catalyst, such as dilithium naphthalene and the like, to form the center polymer block terminated at both ends with a metallic radical such as lithium. Thereafter, the styrene monomer is injected into the system and both of the terminal polystyrene end blocks formed substantially simultaneously. Another process, which is generally viewed as a coupling process, may be employed. In the coupling process, the first stage is as described above with regard to forming the initial block A (polystyrene) terminated with an alkali metal, such as lithium. This is again followed by the introduction of butadiene to form an A-B polymer block thereof, having a molecular weight generally only about half that desired in the final product. At this stage, a difunctional coupling agent is then added to form the desired three-block polymer i.e., A-B-A. In this case, the polymer contains an insignificant amount of a coupling agent in the center block B. This coupling agent, or, more accurately, its residue, is ignored in generally describing thermoplastic rubber copolymers having polystyrene end blocks and a polybutadiene mid block.

The polystyrene moiety of the A-B-A block copolymers employed in this invention may vary, but there should be sufficient polystyrene moieties in the block copolymer to maintain thermoplastic characteristics of the material. Similarly, the polybutadiene moiety may vary so long as a sufficient polybutadiene mid block is present to maintin the elastomeric qualitities of the thermoplastic rubber when at room temperature. The foregoing applies both with respect to the molecular weight of the polystyrene blocks and polybutadiene mid block as well as to the weight percent of polystyrene blocks and the polybutadiene mid block. Generally, the polybutadiene blocks will be present in a major amount, that is about 50% or more by weight, and the polystyrene blocks will be present in a minor amount, for example, at least about 8% by weight and more typically at least about 15% or 20% by weight up to less than about 50% by weight. In order to obtain the most beneficial advantages from the present invention, especially when forming road repair laminates of the type set forth in the incorporated applications, the styrene and butadiene moiety of the A-B-A block copolymers will be selected such that the copolymers have a solution viscosity (25% by weight in toluene at 77° F.) of less than about 8000 or 9000 cps. and preferably less than about 5,000, for example 4000. Preferably the weight ratio of butadiene to styrene in the thermoplastic rubber will be less than about 79:21 and more desirably less than about 72:28.

Reaction products of asphalt, a polymerizable vinyl aromatic monomer and a rubbery polymer will be provided with improved elastic recovery rates, increased viscosity stability, less tack and lower viscosity by employing the above described thermoplastic rubbery linear block copolymer having polystyrene end blocks and a polybutadiene mid block for the rubbery polymer and heating the ingredients for a time and at a temperature sufficient to allow the reaction to proceed. With respect to the involved type reactions it will be found that in plotting viscosity against time, at a given reaction temperature, a curve generally having three portions will be obtained. Actually, there may be a fourth portion in the initial stages of the reaction where the curve will show a slight decrease in viscosity, but this is generally felt to be a dissolution phenomenon, where the system becomes more homogeneous and flowable, rather than the result of a chemical reaction and, consequently, this early viscosity changing stage is not viewed as part of the three portion curve. The first portion of the curve is characterized by a generally modest increase in viscosity and is followed by the second portion which is more steep than the first portion because of a more rapid increase in viscosity. This second portion is then followed by the third, or plateau, portion which is characterized by a slow, or modest, viscosity increase. Suitably, the reaction will be conducted for a time sufficient for the viscosity to reach the third, or plateau, portion of the viscosity-time curve. This viscosity where the second portion of the curve generally changes to the plateau portion of the curve may be viewed as a plateau viscosity. Preferably, however, the reaction will be conducted for a time which is at least about 20 or 25% greater than the time needed to reach the plateau viscosity. Times of about 1.2 to about 1.5 times the time needed to reach the plateau viscosity at a given reacting temperature produce outstanding chemically modified asphalts. Preferably, the ingredients will be reacted by heating at a temperature of about 340° F. to about 360° F. for a time of about 20–24 hours. The reaction will be conducted at a temperature which is less than the thermal degradation temperature of the thermoplastic rubber employed.

The polymerizable vinyl aromatic monomer preferably will be one of the general formula $$(R_1)(R_2)C=C(R_2)(R_3),$$

wherein $R_1$ is an aromatic group containing six to 12 carbon atoms, including a phenyl group, a substituted phenyl group, wherein the substituent is any one of an amino group, a cyano group, a halogen group, a C1 to C3 alkyl group, a hydroxy group, a nitro group, etc. $R_2$ is preferably hydrogen or a lower alkyl, e.g., a $C_1$ to $C_5$ alkyl such as methyl and $R_3$ is hydrogen or such lower alkyl.

In addition to the above type vinyl aromatic monomers, use can also be made by employing, in addition thereto, a polyfunctional vinyl aromatic monomer of the formula $CH_2=C(H)(R_4)C(R_5)=C(H)(R_6)$ wherein $R_4$ is a divalent aromatic group containing six to twelve carbon atoms and preferably a phenylene group, and $R_5$ and $R_6$ have the same meaning as described above with respect to $R_2$ and $R_3$. Illustrative of a preferred polyfunctional vinyl aromatic monomer is divinylbenzene. When use is made of a polyfunctional vinyl aromatic monomer in combination with the above described vinyl aromatic monomers, such as styrene, generally the polyfunctional vinyl aromatic monomer will be present in an amount of about 2 to about 5% by weight based on the weight of the above vinyl aromatic monomer of the formula $(R_1)(R_2)C=C(R_2)(R_3)$.

As is known in the art, glass fiber reinforcements generally comprise a bundle of glass fibers with the bundle including a multitude of closely spaced individual glass fiber filaments. Compositions of the present invention show the ability to impregnate such bundles whether the bundle be, for example, a chopped strand or whether the bundle is a roving in, for example, a woven roving reinforcement material. It will be found that substantially the entire surface area of all of the idividual glass fiber filaments of the bundle will be coated with the present composition as opposed to merely having substantially only the externally exposed glass surfaces of the bundle being coated. This ability of the present compositions to penetrate and coat the internal individual glass fiber filament surfaces provides for decreased abrasion resistance of the fibers and, consequently, enhanced tensile strengths and reinforcement capability. Thus, according to one aspect of the invention, strands of glass fiber can be dispersed in the compositions of this invention, and such reinforced chemically modified asphalt can, for example, be employed to repair potholes, cracks and the like. Additionally, glass fiber bundles which have been impregnated with the present compositions can be used as a reinforcement for other materials, including asphaltic concrete, rubber and plastics.

Preferably, however, the present compositions are employed to form laminates which may, for example, be used in highway repair and maintenance purposes, of the type generally set forth in the incorporated pending applications. According to this aspect of the invention, a fibrous glass reinforcement material is treated with the compositions of the present invention resulting in the formation of a membrane in which the fibrous glass reinforcement is impregnated with the present compositions. Thereafter, one side of the membrane has a suitable pressure sensitive adhesive applied thereto, and these laminates may then be employed in the highway maintenance and repair industry to, for example, minimize the occurrence of reflection cracking. Suitable adhesives are set forth in the incorporated applications and also in co-pending application U.S. Ser. No. 407,395. Exemplary fibrous glass reinforcements are various mats, including chopped strand mats, continuous strand mats, swirl mats, woven and non-woven fabrics, such as, for example, woven rovings, insect screening, scrim and the like.

It will be found that the prior art compositions, which are the reaction product of asphalt, a vinyl aromatic monomer and a rubbery polymer, may be provided with the improved properties as contemplated herein by simply employing the present A-B-A thermoplastic rubber copolymers for the rubber previously employed. Consequently, the proportions of materials may vary over wide ranges. For the best results, however, especially for purposes of producing a chemically modified asphalt to be employed in forming road repair laminates of the type alluded to above, the asphalt will be AC-20 paving grade and will be employed in an amount of about 75 to about 88% by weight, the vinyl aromatic monomer will be styrene in the amount of about 9 to about 13% by weight and the thermoplastic rubber will be Kraton 1101 material in an amount of about 6 to about 8% by weight. Generally, preferred formulations of the present invention will have viscosities of less than 800 cps. at 380° F. and more desirably less than about 550 cps. at 380° F.

Any of a wide variety of asphalts may be employed so long as the thermoplastic rubber copolymer contemplated herein is compatible with that asphalt. That is, the asphalt and rubber, in the presence of the vinyl aromatic monomer, will be able to be combined with agitation into a substantially homogeneous mixture when heated generally in the range of about 325° F. to 375° F. A paving grade asphalt, like AC-20, may initially appear incompatible in that the system is heterogeneous, but when agitated for a couple of hours, in the presence of the vinyl aromatic monomer, such asphalt is compatible.

While the above describes the invention with sufficient particularity to enable those skilled in the art to make and use same, nonetheless, further exemplification follows.

EXAMPLE

Chemically modified asphalt was prepared from a paving grade asphalt (AC-20) in an amount of about 81 to about 82% by weight, styrene, in an amount of about 10 to about 11% by weight, and a thermoplastic rubber copolymer, having polystyrene end blocks and a polybutadiene mid block (Kraton 1101 thermoplastic rubber having a solution viscosity, 25% by weight in toluene at 77° F., of about 4000 cps. and a ratio of butadiene to styrene of about 70:30) in an amount of about 7 to about 8% by weight. This chemically modified asphalt was prepared in a reactor equipped with an agitator and a reflux condenser by melting the asphalt and then adding the thermoplastic rubber and styrene followed by heating after the addition was complete at a temperature of about 175° C. (347° F.) for about 24 hours. As a reference sample, another chemically modified asphalt was prepared from AC-20 asphalt in an amount of about 77.6% by weight, styrene in an amount of about 10% by weight and a styrene-butadiene elastomer (Solprene 12050 elastomer) in an amount of about 12.5% by weight. This reference, or control, formulation has in the past shown to possess many outstanding properties and was generally similarly manufactured. The reference sample exhibited a viscosity of generally about 1,200–1,600 cps at about 380° F., whereas the formulation of the present invention exhibited a viscosity of about 250–400 cps at 380° F. and most typically about 350–380 cps.

In order to compare the viscosity stability of the two materials, they were subjected to a heating cycle wherein their viscosity was first determined by heating to about 380° F. after which time samples were respectively heated to temperatures of 450° F., 480° F. and 500° F. and then cooled back to the reference temperature, namely 380° F. The viscosity stability was determined as the ratio of the viscosity after cooling to 380° F. relative to the viscosity at 380° F. prior to the respective heat treatments. Generally, the samples were held at the 450° F., 480° F. and 500° F. levels for about 5-30 minutes. Both the formulation of the present invention and the control formulation showed a viscosity recovery of 100% when subjected to the 450° F. heating cycle. When subjected to the 480° F. heating cycle, viscosity recoveries for the formulation of the present invention were typically about 100%, whereas typical viscosity recovery for the control sample was about 94%. Viscosity recoveries for the formulation of the present invention when subjected to the 500° F. heating cycle was approximately 85–90%, whereas the control was about 50%.

The elastic recovery rates of the two materials were determined by, first of all, casting films approximately one inch wide by nine inches in length and approximately one-eighth inch in thickness. These films were then clamped in a vertical position, and a 226 g. weight was attached to the bottom portion of the respective films. The films were then allowed to extend to 100% of their initial unweighted length, and the elastic recovery rate was measured by determining the length of time for the films to return to substantially their original length. The recovery time for the formulations of the present invention were on the order of about 15–16 hours, whereas the recovery time for the control formulation was approximately 20–24 hours.

The formulations of the present invention exhibited significantly less tackiness than the reference sample. For example, in a test wherein steel balls were rolled down an inclined planes, with the inclined plane being coated with the respective formulations, balls typically rolled approximately four inches down the incline before stopping when employing the formulations of the present invention, whereas the balls stopped after approximately three-quarter to one inch when employing the control formulation.

Woven glass roving was coated with the two formulations by a dip coating process in which the woven roving was immersed in molten baths of the respective formulations. Upon cooling, the samples were severed and visually inspected. It was observed that substantially all of the individual glass filaments of the roving which had been dipped into the formulation of the present invention were substantially coated along their entire length thus showing the impregnant qualities of the present formulation. In contrast, the sample which had been dip coated with the reference formulation showed very little impregnation of the glass fiber bundles. Additionally, such dip-coated samples were subjected to a flexing action for approximately five million cycles and then the tensile strength of the flexed samples measured and compared to the tensile strength of the samples prior to flexing. The woven rovings, which had been impregnated with the formulation of the present invention, showed substantially the same tensile strength before and after the flexing action. In contrast, the woven rovings, which had been dip-coated with the control formulation, showed a tensile strength after flexing of about 80% that of its original unflexed value. Woven roving, which had not been coated with either formulation, showed a tensile strength of about 76% of its original unflexed value.

Additionally, it was observed with Instron testing that, after approximately 300% elongation, the formulations of the present invention showed significantly higher resistance to strain, or further elongation, then did the control formulation.

INDUSTRIAL EXPLOITATION

The present invention is preferably industrially exploited by impregnating fibrous glass reinforcements, for example, a woven roving, to provide a membrane which after cooling is then coated on one side with a suitable asphaltic-based pressure sensitive adhesives. These laminates are then employed for highway repair and maintenance purposes to minimize the occurrence of reflective cracking. The formulations of the present invention show excellent binding to asphalt overlays. Because of their many desirable properties, and especially the low viscosity, the materials are also outstandingly adapted for various protective coating applications e.g. for forming waterproof membranes as on bridgedecks.

While the above describes the present invention, it will, of course, be apparent that modifications are possible which, pursuant to the patent statutes and laws, do not depart from the spirit and scope thereof.

I claim:

1. In a glass fiber bundle comprised of a multitude of individual glass fiber filaments and having an asphaltic coating thereon, the improvement wherein said coating is a reaction product of asphalt, a vinyl aromatic monomer and a linear block copolymer of styrene and butadiene having polystyrene end blocks and a polybutadiene mid block, said composition impregnating said bundle by coating substantially the entire surface area of said individual filaments, and wherein said composition has an increased elastic recovery rate, increased viscosity stability, is less tacky, has a lower viscosity and improved glass fiber bundle impregnant qualities compared to a composition which is the reaction product of said asphalt, said vinyl aromatic monomer and a rubbery polymer which is a styrene-butadiene copolymer of the A-B type.

2. The bundle of claim 1 wherein in said improvement said vinyl aromatic monomer reactant is styrene.

3. The bundle of claim 2 wherein in said improvement said asphalt reactant has a penetration of about 40–65 and a viscosity at 260° F. of about 500–550 cps and a viscosity at 300° F. of about 100–120 cps.

4. The bundle of claim 2 wherein in said improvement said asphalt reactant is an AC-20 paving grade and said asphalt is used in an amount of about 75 to about 88 percent by weight, styrene in an amount of about 9 to about 13 percent by weight and said thermoplastic rubber copolymer in an amount of about 6 to about 8 percent by weight and wherein said thermoplastic rubber has a solution viscosity of less than 9,000 cps.

5. The bundle of claim 4 wherein in said improvement said asphalt reactant is about 81 to about 82 percent, styrene about 10 to about 11 percent and said thermoplastic rubber copolymer about 7 to about 8 percent and wherein said composition has a viscosity of less than about 550 cps at 380° F.

* * * * *